Aug. 19, 1947.  R. HEPP  2,425,936
APPARATUS FOR TAKING FOLDED OR UNFOLDED SHEETS OF PAPER FROM A PILE
THEREOF AND CONVEYING THE SAME TO A DEVICE FOR FURTHER TREATMENT
Filed April 17, 1942   6 Sheets-Sheet 1

Fig.1.

Inventor:
Rudolf Hepp
by Frank Reinhold.
Attorney.

Aug. 19, 1947.  R. HEPP  2,425,936
APPARATUS FOR TAKING FOLDED OR UNFOLDED SHEETS OF PAPER FROM A PILE
THEREOF AND CONVEYING THE SAME TO A DEVICE FOR FURTHER TREATMENT
Filed April 17, 1942  6 Sheets-Sheet 3

Inventor:
Rudolf Hepp
by Frantz Reinhold
Attorney.

Aug. 19, 1947. R. HEPP 2,425,936
APPARATUS FOR TAKING FOLDED OR UNFOLDED SHEETS OF PAPER FROM A PILE
THEREOF AND CONVEYING THE SAME TO A DEVICE FOR FURTHER TREATMENT
Filed April 17, 1942 6 Sheets-Sheet 5

Inventor:
Rudolf Hepp
by Franz Reinhold
Attorney.

Patented Aug. 19, 1947

2,425,936

UNITED STATES PATENT OFFICE 2,425,936

APPARATUS FOR TAKING FOLDED OR UNFOLDED SHEETS OF PAPER FROM A PILE THEREOF AND CONVEYING THE SAME TO A DEVICE FOR FURTHER TREATMENT

Rudolf Hepp, Berlin, Germany; vested in the Attorney General of the United States Application April 17, 1942, Serial No. 439,378
In Germany April 25, 1939

4 Claims. (Cl. 271—11)

My invention relates to improvements in apparatus for taking folded or unfolded sheets of paper from a pile thereof and conveying the same to a device for further treatment. More particularly my invention relates to apparatus of the type in which the said sheets are successively taken from the bottom side of a pile by means of a conveying device movable below the pile and comprising a roll for taking the sheet from the pile and pile supporting means mounted on the said conveying device.

One of the objects of the improvements is to provide an apparatus of this type in which the bottom side of the pile is exactly held in the proper position relatively to the said roll, and with this object in view my invention consists in providing rigid supporting means on the said conveying device which are movable in such a way that they travel across the bottom side of the sheet substantially with friction, the said supporting means being moved in a direction opposite to the direction of the progressive movement of the said conveying device and substantially at the same velocity as the said conveying device.

In a preferred embodiment of the invention the said supporting means are in the form of a set or sets rollers located one beside the other and adapted to be rotated during the movement of the conveying device substantially at the velocity of the said progressive movement of the conveying device and in a direction opposite to the said movement of the conveying device.

Another object of the improvements is to provide an apparatus of the class indicated which is capable of rapid operation, and with this object in view my invention consists in constructing the said conveying device in the form of a rotary frame on which the said roll or gripping apparatus is mounted, and which is continuously rotated for moving the said gripping device across the bottom face of the pile.

Another object of the improvements is to provide apparatus for taking the sheets from the conveying device, and with this object in view my invention consists in associating a rotary drum with the said conveying device, the said drum having a gripper arm pivotally mounted eccentrically of its axis and in position for gripping a sheet conveyed thereto by said conveying device, the said gripping device being yieldingly connected with means for imparting rocking movement thereto for moving the same into positions respectively for taking a sheet from said conveying device and for releasing the said sheet.

Other objects of the improvements will appear from the following description.

For the purpose of explaining the invention several examples embodying the same have been shown in the accompanying drawings in which the same reference characters have been used in all the views to indicate corresponding parts. In said drawings

In the example shown in the drawings the operative parts of the apparatus are mounted on a frame comprising side members 1 formed with arms 2 and 3 and a projecting portion 4. On the said frame three distinct devices are mounted, viz., a rotary device 5 supporting piles of sheets 6 and adapted to take therefrom the sheets, devices 7 holding the piles in position, and a rotary drum 8 receiving the sheets from the device 5 and carrying the same to apparatus in which they are further treated.

The rotary device 5 comprises two end plates 9 and 10 and one or more intermediate plates 11 all fixed to a shaft 12 rotatably mounted in bearings 13 provided in the side members 1. On the said plates 9, 10 and 11 gripping rolls and pile supporting rollers 40 are rotatable. The gripping rolls comprise tubular shafts 14 each extending from the end plate 9 to the end plate 10. At one of their ends the said tubular shafts have sleeves 15 fixed thereto which are rotatable in bearings 16 made in the plates 9, and at their opposite ends the shafts are fixed to hubs 17 rotatably mounted on trunnions 18 fixed in bores of the plate 10. On the tubular shafts 14 gripping or suction disks 20 are mounted which are adapted to be fixed in position on the shafts by means of screws 21, and which are spaced from one another by disks 22. The said spacing disks 22 are formed with cut-out portions 23 the end walls of which provide abutments for rods 24 extending through bores made in sets of three disks 20. As shown the disks 20 and 22 are combined into sets each comprising three disks 20 and two disks 22, and each set is associated with a support for a pile of sheets to provide a gripping and conveying device for a sheet conveying station, the apparatus being provided with a suitable number of stations two of which have been illustrated in Fig. 1. The said rods 24 carry nuts at their ends adapted to clamp the disks 20 and 22 together. The disks 22 are fixed to the shafts 14 by means of screws 19, and the disks 20 may be set into different angular positions relatively thereto and with the rods 24 bearing on either one of the abutments provided by the notches 23 for setting the gripping disks 20 of any station into and out of operative positions, as will be described hereinafter.

Figure 2:
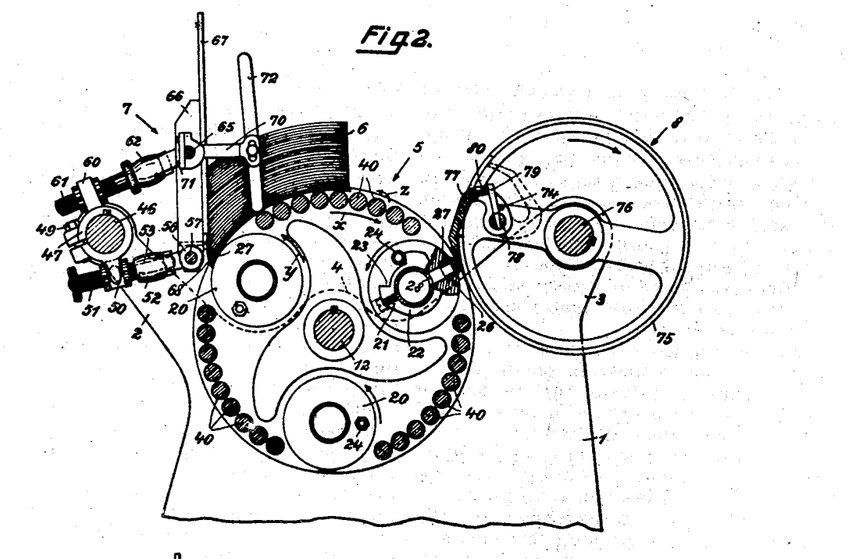
Fig. 2 is a sectional elevation taken on the line 2—2 of Fig. 1 and showing one of the rotatable members in position for taking a sheet from the pile and another rotatable member in position for delivering a sheet to a receiving device adapted to carry the said sheet to an apparatus for further treatment of the sheet.

As is shown in Fig. 2, the gripping disks are provided each with a socket 26 in which a suction cap 27 is located which is formed with an axial bore, and which communicates through an inwardly directed extension of the socket 26 and a hole 28 made in the wall of the tubular shaft 14 with the inner part of the said shaft, for producing suction within the cap 26. The outer face of the end plate 9 is formed with a finished portion 30 which is loosely engaged by a segmental suction head 31 disposed concentrically of the shaft 12. The said suction head is formed with a segmental cavity 32 and it is elastically held in contact with the surface of the portion 30 by means of coiled springs 33 located between the outer face of the head 31 and a plate 34 secured to the side member 1, pins 35 being fixed to the head 31 and loosely engaging holes made in the plate 34 for holding the head 31 and the springs 33 in position. The cavity 32 is adapted to be thrown into communication with the hollow of the shafts 14 and to be disconnected therefrom as the plates 9, 10 rotate, as will be described hereinafter. The head 31 is connected by a pipe 36 with a vacuum chamber or other suction device.

The suction head 31 is provided at both ends with ears 29, and at their inner sides the said ears are formed with cut-out portions in which slides 37 are embedded by means of which the length of the segmental cavity 32 may be varied for timing the connection of the hollow of the shafts 14 and the suction caps 27 with the said cavity and the suction chamber. The said slides are fixed in set positions by means of screws 38 engaging in slots 39.

Figure 3:
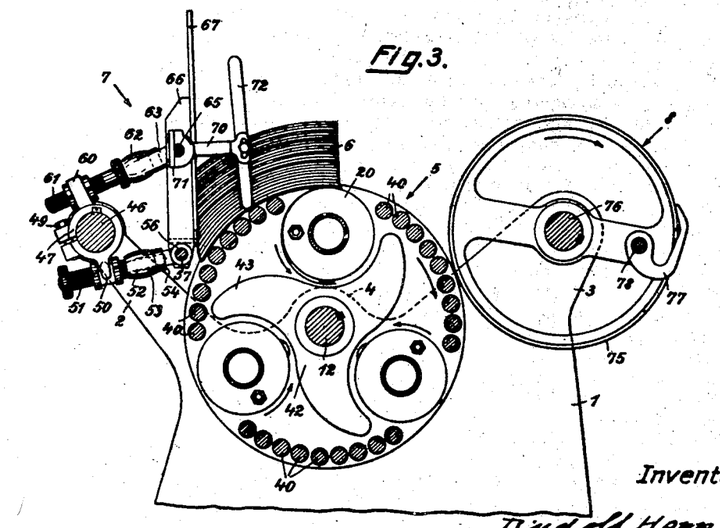
Fig. 3 is a sectional elevation similar to the one illustrated in Fig. 2 and showing one of the rotatable members in an intermediate position in which it has taken a sheet from the pile.
Figure 4:
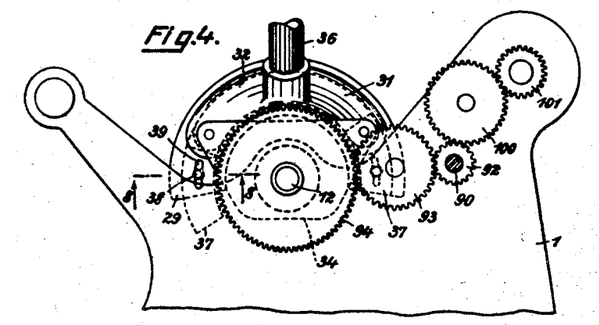
Fig. 4 is an end elevation of the apparatus showing the gearing for driving the operative parts of the apparatus and the suction head forming a part of the gripping device.
Figure 5:
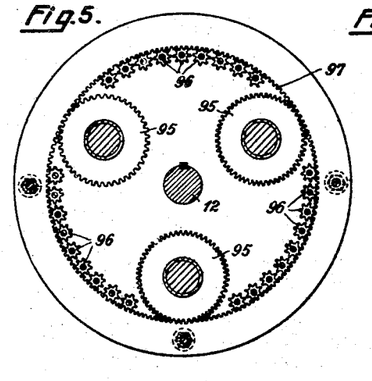
Fig. 5 is a sectional elevation taken on the line 5—5 of Fig. 1.

As appears from Figs. 2 and 3, in the example shown in the figures three suction rolls 14, 20 are provided, which are displaced relatively to one another at angles of 60°. But I wish it to be understood that my invention is not limited to the number of the suction rolls shown herein.

Further, I wish it to be understood that my invention is not limited to the use of the gripping means shown herein and operated by suction.

Between the suction disks 20 the aforesaid pile supporting rollers 40 are located which provide rigid bottom supports for the pile. As shown the said supporting rollers are smaller in diameter than the gripping disks, and they are located close to one another and as near as possible to the suction disks 20. The supporting rollers 40 are located near the circumference of the plates 9, 10 and 11 on a concentric circle and their outer portions provide a concentric support for the pile of sheets. They are rotatably mounted in the plates 9, 10 and 11, and at one of their ends they have trunnions 41 fixed in sockets, which are rotatable in bores of the plate 10.

To the shaft 12 disks 42 are secured one for each station, and the said disks are formed with wings 43 extending between successive suction disks 20 and providing guiding members for the sheets of paper taken from the pile as will be described hereinafter.

The shaft 12, the rolls 14, 20 and the rollers 40 are provided with mechanism for imparting rotary movement thereto, which will be described hereinafter.

Figure 11:
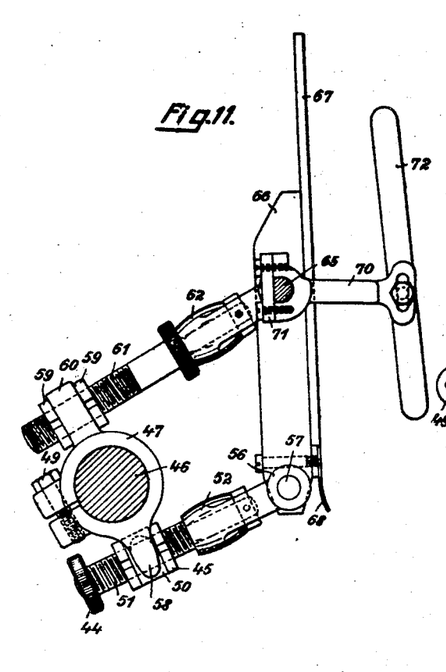
Fig. 11 is an elevation on an enlarged scale showing a part of the pile supporting means.
Figure 12:
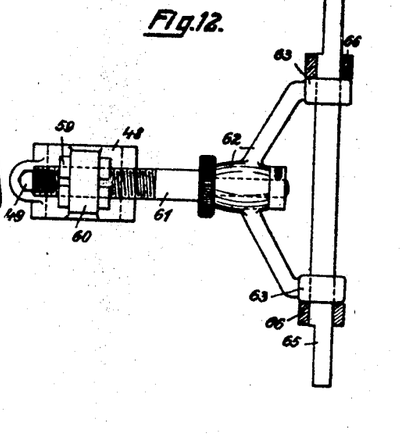
Fig. 12 is a top plan view of the upper part of the supporting means shown in Fig. 11.
Figure 13:
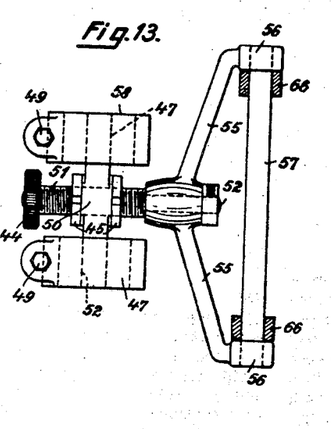
Fig. 13 is a bottom view of Fig. 11 showing another part of the said supporting means.
Figure 14:
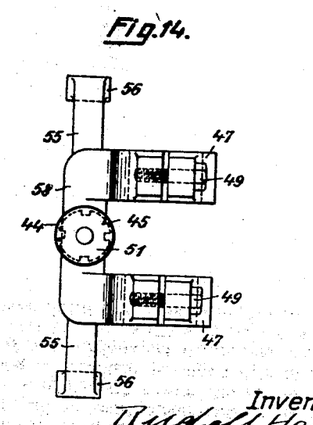
Fig. 14 is a side elevation of Fig. 13, Figs. 15—18 are diagrammatical elevations showing modifications of the conveying device.

The pile of sheets 6 supported on the rollers 40 is held in position by the following mechanism: On a rod 46 fixed to the arms 2 of the side members two split rings 47 and a split ring 48 are clamped by means of screws 49. The rings 47 are cast integral with a downwardly directed bail 58 formed with an internally screw-threaded eye 50 engaged by a screw-threaded spindle 51 carrying a milled disk 44 the said spindle being adapted to be fixed in position by nuts 45. On the reduced end 52 of the said spindle 51 a bail 55 is pivotally mounted which is formed at its ends with eyes 56 to which a rod 57 is secured. The split ring 48 is formed with an upwardly directed internally screw-threaded eye 60 which is engaged by a spindle 61 adapted to be fixed in position by nuts 59. On the reduced end of the said spindle a bail 62 is pivotally mounted eyes 63 of which carry a rod 65. To the outer ends of the rods 57 and 65 upright rails 66 are secured which carry laths 67. The said laths provide supports for the pile 6 as is shown in Fig. 3. To the bottom ends of the laths sheet metal tongues 68 are secured which extend into position between the disks 20, and which are bent inwardly at their bottom ends and towards the said disks, as is best shown in Figs. 2 and 11.

The laths 67 are adapted to be set into different positions according to the character of the sheets of the pile 6, and more particularly they may be elevated and inclined from the vertical more or less and shifted with the tongues 68 circumferentially of the gripping device 5. For thus setting the laths 67 the split rings 47 and 48 and the nuts 45 and 59 are loosened, the spindles 51 or 61 are screwed inwardly or outwardly, and the split rings are set circumferentially of the rod 46 and fixed again in position.

To the ends of the upper rods 65 arms 70 are fixed by means of clamping plates 71, and the said arms carry laths 72 which engage the pile 6 at its ends. The said laths 72 may be set in different positions in accordance with the breadth of the sheets by shifting the arms 70 longitudinally of the rods 65.

Figure 1:
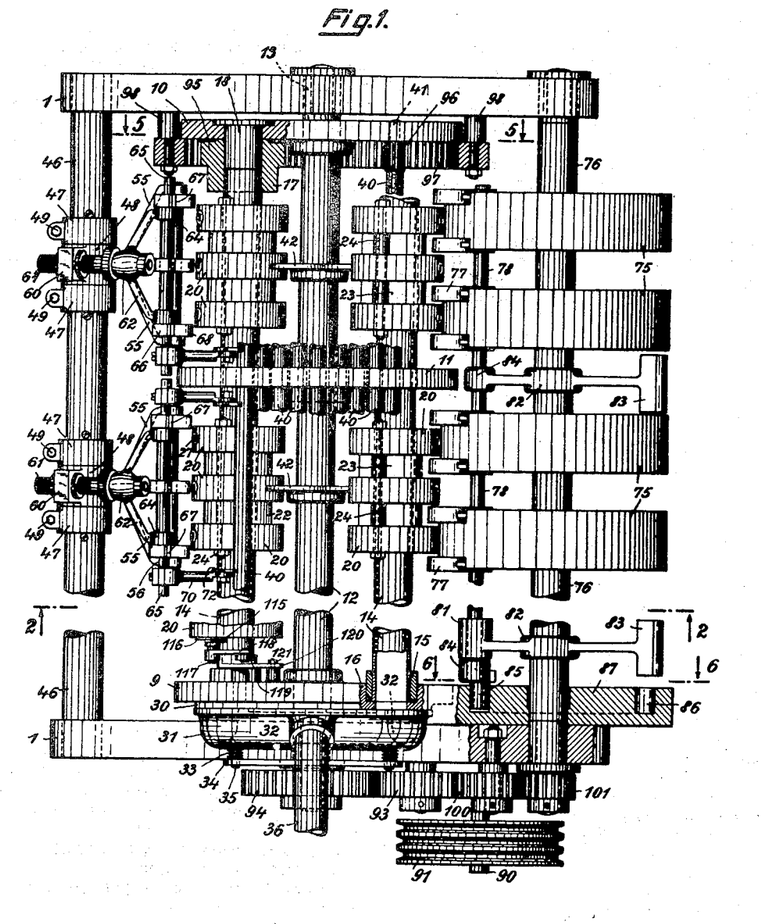
Fig. 1 is a top plan view of the apparatus partly in section.

It will be understood that laths 67 and cooperating mechanism are provided for each station of the apparatus, Fig. 1 showing two of such stations and pile supporting means 67.

Figure 6:
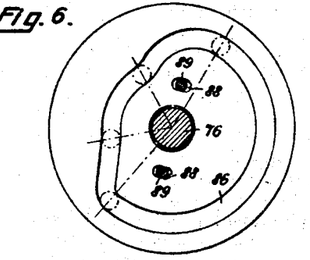
Fig. 6 is a detail view showing the cam controlling the movement of the gripping member mounted on the sheet receiving drum, the said view being taken in the direction of the arrows 6—6 of Fig. 1.
Figure 7:
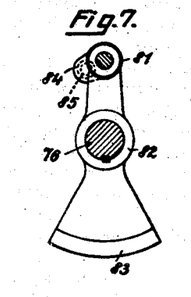
Fig. 7 is a detail view showing a part of the gripper controlling mechanism.
Figure 8:
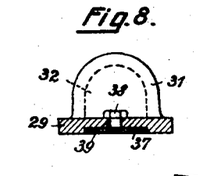
Fig. 8 is a detail sectional view taken on the line 8—8 of Fig. 4 and showing a portion of the suction head.
Figure 9:
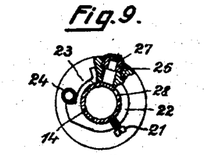
Fig. 9 is a detail view showing the gripping roll in inoperative position.

At the side of the sheet conveying device 9, 10, 11, 12 remote from the pile supporting devices 67, 72 the said sheet receiving devices 8 one for each station are provided. As appears from Figs. 1 to 3, 6 and 7 the said sheet receiving devices comprise disks 75, two for each station, fixed to a shaft 76 rotatably mounted in the side members 1, 1 and adapted to be rotated by mechanism to be described hereinafter. On each disk a gripping arm 77 is mounted, and all the arms 77 are mounted on a pivotal shaft 78. The said gripping arms are adapted to be moved from the position shown in Fig. 2 in dotted lines into the position shown in full lines, while the drums 8 perform their rotary movement. Each gripping arm is loosely mounted on the shaft 78 and it is adapted to be moved into and out of gripping position by a pin 79 fixed to the shaft 78 and acting on the gripping arm 77 through a coiled spring 80, the said spring being provided for adapting the gripping arm to sheets or folded sheets of different thicknesses. The pins 79 bear on pins 74 fixed to the gripping arms, the said pins 74 retracting the gripping arms when the shaft 78 is turned clockwise. Near one end the shaft 78 is mounted in an eye 81 carried by an arm 82 fixed to the shaft 76, a counter weight 83 being provided for balancing the eye 81 and the parts connected therewith. To the end of the shaft 78 an arm 84 is secured which carries a roller 85 engaging in a cam groove 86 made in a disk 87 fixed to the side member 1. As is shown in Fig. 6 the disk is fixed in position by means of screws 89 passing through slots 88, so that the disk 87 and the cam groove 86 may be adjusted in position.

The driving mechanism of the parts of the apparatus is constructed as follows: To a shaft 90 which is rotatably mounted in the side member 1 of the frame a pulley 91 and a pinion 92 are secured. The said pinion is in engagement with a loose gear wheel 93 and the said gear wheel 93 is in mesh with a gear wheel 94 secured to the shaft 12. Thus, rotary movement is imparted to the plates 9, 10 and 11. The hubs 17 are made integral with gear wheels 95, and the trunnions 41 are made integral with pinions 96, and the said gear wheels 95 and pinions 96 are in mesh with an internal gear 97 fixed to one of the side members 1 of the frame, spacing members 98 being provided between the said side member 1 and the internal gearing 97.

The gear wheel 92 is in mesh with a loose gearing 100, which is in mesh with a gear 101 secured to the shaft 76.

The operation of the apparatus is as follows: Piles of sheets of folded or unfolded paper or the like are placed on the rollers 40 in position for being laterally supported by the laths 67 and 72. The proper position of the laths 67 regulated by setting the split rings 47 and 48 and the screws 51 and 61 into the proper positions after first loosening the split rings 47 and 48. Thus the height and the angularity of the laths 67 and also the position of the tongues 68 relatively to the conveying device comprising the rolls 14, 20 and the rollers 40 is adjusted. As appears from Fig. 2, the rollers 40 provide a cylindrical support for the pile, and the suction caps 27 slightly project beyond the outer circumference of the series of rollers 40, so that the said caps safely engage the sheets of paper.

If only a part of the conveying devices is used, the suction apparatus of the other conveying devices is made inoperative by turning the disks 20 from the positions shown in Fig. 2 in which the rods 24 bear on the right hand end wall of the notch 23 anti-clockwise and into positions with the left hand end walls of the said notches bearing on the rod 24, thus shifting the socket 26 out of communication with the hole 28 of the tubular shaft 14.

Now the operation of the apparatus is started, and the conveying device is rotated in the direction of the arrow $x$ shown in Fig. 2. The suction caps 27 of the left hand set of disks 20 are now in position for engaging the left hand or front end of the lowermost sheet of the pile 6, and at this moment the said suction caps and their sockets 26 are in communication with the suction apparatus through the tubular shaft 14, the cavity of the suction head 31 and the pipe 36. Thus the lowermost sheet is gripped at its left hand end. As the conveying device 5 continues its rotary movement the disks 20 are rotated anticlockwise, as is indicated by the arrow $y$, by the engagement of the gear wheel 95 with the internal gear 97. The circumferential velocity of the disks 20 is equal but opposite to the circumferential velocity of the conveying device 5 and therefore the said disks roll on the lower face of the lowermost sheet without friction so as to peel the lowermost sheet from the pile.

In a similar way the rollers 40 are rotated in the direction of the arrow $z$ so that also these rollers roll on the sheet without friction. But I wish it to be understood that my invention is not limited to the construction herein described in which the rollers 40 move on the sheet without friction, and that in some cases slight friction may be desirable, as will be described hereinafter. Such slight friction may be accomplished by varying the gear ratio of the gearings 96 and 97.

The sheet which has thus been taken from the pile is carried along by the disks 20 engaging the same, Fig. 1 showing three successive disks for each station. In the position of the parts shown in Fig. 2 the disks 20 located at the left of the conveying device 5 have engaged the lowermost sheet with their suction caps 27, and they are about to peel the same from the said pile. In Fig. 3 the conveying device has proceeded so far that the said disks are in the upper or intermediate position in which the sheet is placed around the same and held in position by the disk 42, 43. In Fig. 2 the right hand disks 20 have arrived in position for transferring the sheet to the receiving device 8. The grippers 77 are swung from the position shown in Fig. 2 in dotted lines into the position shown in full lines, in which they engage the sheet, the said swinging movement of the grippers being caused by the roller 85 carried by the shaft 78 passing from the portion of larger diameter of the groove 86 into the portion of smaller diameter thereof. Thus the sheet is taken from the device 5 and transferred to the receiving device 8 by means of which it is carried to another apparatus for further treating the sheet, for example to an apparatus for assembling folded or unfolded sheets. As the sheets are successively taken from the pile, the remaining sheets gradually follow by gravity and the said gradual movement is assisted by the construction of the supporting rollers 40. The parts of the said rollers engaging the pile are spaced from one another so as to provide gaps into which portions of the sheets are sunk, and as the rollers continue their movement the pile is slightly vibrated. Thereby the sheets of the pile are made loose from one another and from the tongues 68. The tongues 68 loosely arrest the edges of the lowermost sheets by their curved shape so that single sheets are taken from the pile. The shape of the said tongues is adapted to the thickness and elasticity of the sheets, and tongues of various shapes and curvatures are kept in store and selectively mounted in the apparatus, in accordance with the character of the sheets, so that sheets of any thickness and elasticity are individually taken from the pile. The main part of the weight of the pile is supported on the rollers 40, but a small component of the said weight acts on the laths 67 and the tongues 68 to produce a certain friction for breaking the downward movement of the pile more or less, and the said friction is varied by varying the height and the angularity of the laths 67 and the component of the weight of the pile acting on the said laths. Thus the front edge of the sheet being taken from the pile is relieved of pressure particularly in case of thin sheets.

The rotary movements of the rolls 20 and the receiving device 8 are timed so that the rolls 20 engage the front portion of the sheet to be taken from the pile 6 when the suction cap 27 is in the position shown in Fig. 2, and that the gripper arm 77 is moved into the position for gripping the sheet when the roll arrives in the position for delivering the sheet to the receiving device 8. In the example shown in the figures three rolls 20 and one gripping arm 77 are provided, and therefore, the receiving device 8 performs a complete rotation while the conveying device 5 is rotated through an angle of 120°, and the sheets are removed from the conveying device after rotation thereof through an angle of 120°. Accordingly the gear ratio of the gear wheels 94 and 101 is 3:1. The vacuum supplied to the suction cap 27 is controlled so that it is transmitted to the said caps exactly when the caps are in the position for engaging the left hand front margin of the sheet, and the said vacuum is maintained until the suction caps arrive in the position in which the gripping arms 77 take hold of the sheet, whereupon the vacuum is removed. The supply of the vacuum is exactly timed by means of the slides 37. The gripping arms 77 are controlled so that they get into the positions shown in Fig. 2 in full lines when the sheet has arrived in the position for being delivered to the sheet receiving device 8. They are operated by means of the roller 85 engaging in the groove 86 made in the disk 87, and for properly timing the operation the disk 87 is adapted to be adjusted in position by the screws 89 engaging in the slots 88.

Figure 15:
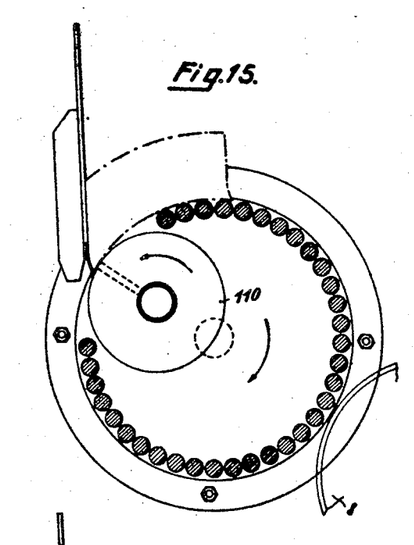
Figure 16:
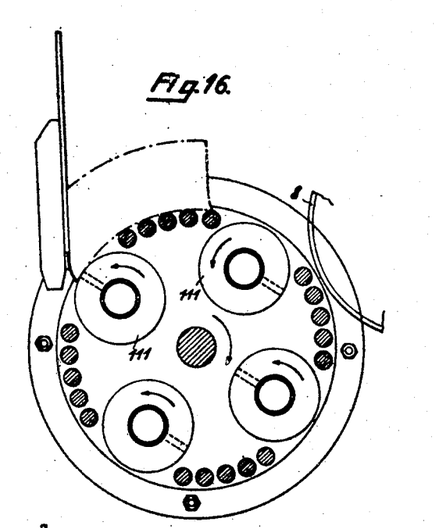
Figure 17:
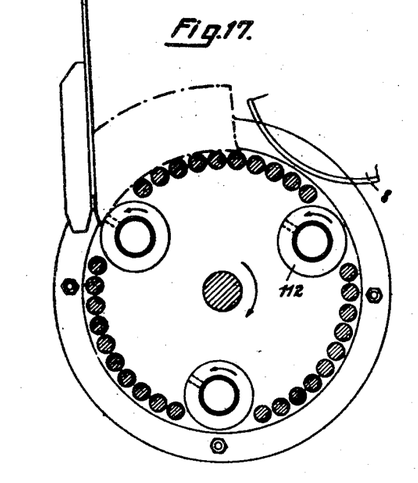
Figure 18:
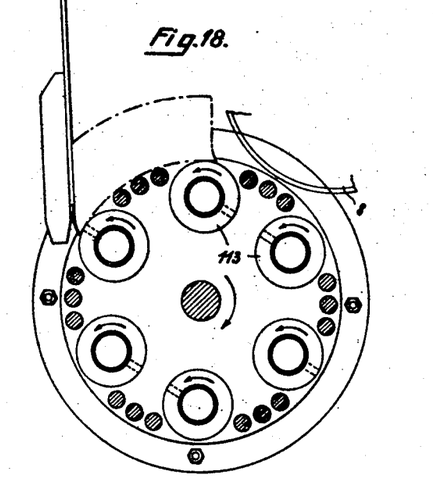

It will be understood that my invention is not limited to a construction in which the conveying device is equipped with three rolls 20. In Fig. 15 I have shown a modification in which a single roll 110 is provided on the conveying device, and Figs. 16 to 18 show examples in which four and six rolls 111, 112 and 113 are provided. The diameter of the said rolls may be R, and the number of rotations made by each roll during a complete rotation of the conveying device $n$. If $n$ is a whole number, the suction device 27 of the roll rotating within the conveying device is operative in the same position of the rolls relatively to the conveying device and after a complete rotation. If, however, $n$ is a fraction, the suction cap 27 of the roll rolling within the conveying device is displaced within the conveying device through an angle corresponding to the denominator of the fraction, the said denominator giving the number of rotations of the conveying device after which the roll arrives again in its initial position relatively to the conveying device.

The number $n$ also determines the angle included between the positions of the suction cap 27 in which the sheet is taken from the pile and in which it is transferred to the receiving device.

For example, in the construction shown in Figs. 1 to 8, where three rolls are provided, the number $n$ is 3, and accordingly the sheet is transferred to the receiving device after a revolution of the roll 20 through an angle of 360:3=120°. In the construction shown in Fig. 15 the diameter of the roll 110 is one half of the diameter of the conveying device and the number $n$ is 2. Accordingly the angle through which the roll revolves within the conveying device into the position for delivering the sheet is 360:2=180°, and accordingly the sheet receiving device 8 is located at an angle of 180° away from the pile. In the modification shown in Fig. 16 the diameter of the rolls 111 is one third of the diameter of the conveying device, the number $n$ is 3, and the angle of revolution of the roll from the pile to the sheet receiving device 8 is 360:3=120°. In the modification shown in Figs. 17 and 13 the diameter of the rolls is one fourth of that of the conveying device and accordingly the number $n$ is 4. Therefore the angle through which the roll is revolved from the pile to the sheet receiving device 8 is 360:4=90°.

The number of the rolls which may be used in a conveying device is limited. In the example shown in Fig. 15, only one roll can be used and in the modifications shown in Figs. 16 to 18 one to eight rolls may respectively be used. On the number of the rolls depends the ratio of the number of rotation of the conveying device and the sheet receiving device. Where a single roll is provided in the conveying device the said ratio is 1:1, where two rolls are provided the ratio is 2:1, etc.

Figure 10:
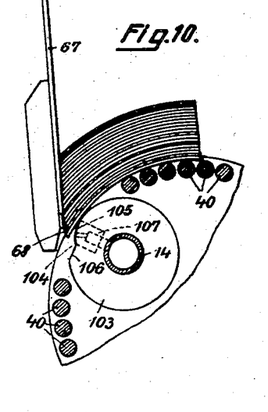
Fig. 10 is a fragmentary sectional elevation showing a modification of the gripping disks.

In some cases I prefer to provide the rolls 20 at the portions first engaging the front edges of the sheets with notches permitting the front edges to be bent away from the pile. This modification has been illustrated in Fig. 10. As is shown in the said figure the suction roll 103 is formed with a notch 104 having an inwardly directed wall 105 curved along a radius smaller than the radius of the circumference of the roll, and a portion 106 connecting the inner end of the said curved portion 105 with the circumference of the roll. The suction head 107 opens to the said curved portion 106. The front edge of the lowermost sheet is spread away from the body of the pile and it engages in the said notch and on the portion 106 of the wall thereof, while the next sheet cannot follow the lowermost sheet, because it is arrested by the tongue 68.

Thick and comparatively stiff sheets or folded sheets may be made to enter the said notch by exerting thereon a certain rubbing action tending to bend the same inwardly and towards the roll, for example by rotating the rollers 40 at a circumferential velocity slightly smaller than that of the conveying device, for which purpose the gear ratios of the gearings 96 and 97 may be varied.

Figure 19:
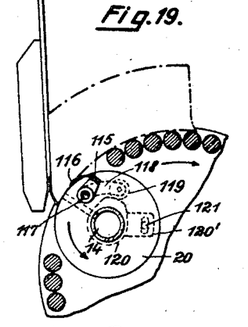
Figs. 19 and 20 are fragmentary elevations showing a modification of the gripping device.

In the modification shown in Fig. 19 gripping needles 116 are provided for drawing the front parts of the sheets towards the rolls 20, preferably in addition to the suction devices. The said needles are fixed to levers 115 one for each roll 20, all the said levers being fixed to a shaft 117 extending through all the rolls 20 from one end of the apparatus to the other one and rotably mounted on the said rolls. To one end of the said shaft an arm 118 is secured which carries a roller 119 engaging a cam 120 mounted on the plate 9 coaxially of the shaft 14. The said cam is provided with a slotted arm 120' engaged by a screw 121 by means of which the angular position of the cam may be adjusted so that the needles 116 engage the lowermost sheet of the pile at the proper moment.

Figure 20:
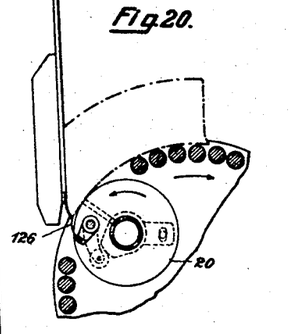

In the construction shown in Fig. 19 the needles 116 are pressed into the sheet in the direction of the rotation of the rolls 20. In the modification shown in Fig. 20 similar needles 126 are provided which engage the sheet in a direction opposite to the direction of the rotation of the roll 20. The said needles and the controlling mechanism thereof are mounted in a manner similar to that shown in Fig. 19.

Figure 21:
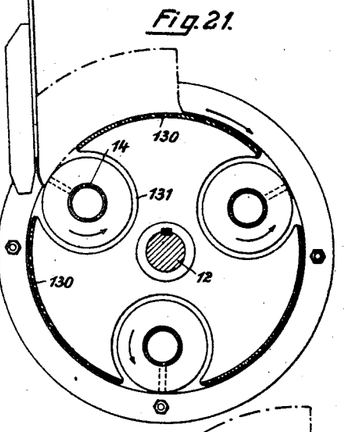
Figs. 21 to 23 are diagrammatical elevations showing modifications of the pile supporting means.
Figure 22:
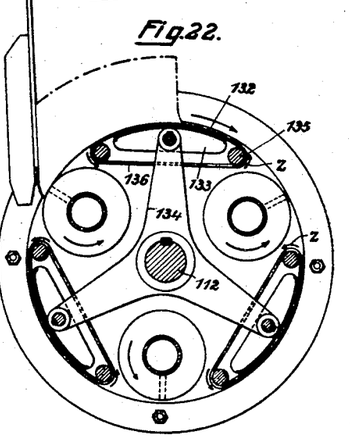
Figure 23:
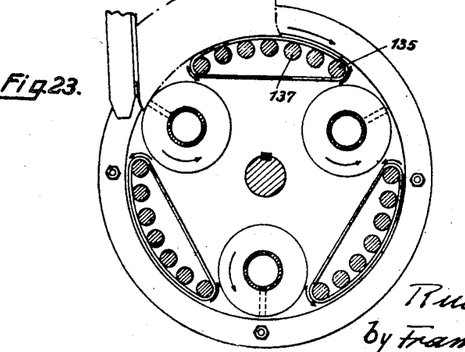

As appears from the description of Figs. 1 to 6, the rollers 40 provide a rigid support for the pile by means of which the sheet is presented to the rolls 20 in the proper position. In Figs. 21, 22 and 23 I have shown modifications of the said rigid supporting means.

The construction shown in Fig. 21 is suitable in such cases in which comparatively low and light piles are supplied to the apparatus. In this case rotary movement of the rigid supporting means may be dispensed with. As shown, the said rigid supporting means consist of segmental plates 130 secured to disks 131 fixed to the shaft 12. It will be understood that the surfaces of the plates 130 are polished, so that the friction thereof on the pile is small.

In Fig. 22 I have shown another modification in which segmental plates 132 are provided for rigidly supporting the pile, the said plates being fixed by means of flanges 133 to arms 134 secured to the shaft 12. On rollers 135 rotatably mounted on the disks 9 and 10 and on the plates 132 endless bands 136 are trained. The rollers 135 are rotated in the direction of the arrows z by mechanism similar to that described with reference to Fig. 1 and driving the rollers 40. Thus, the endless bands 136 move across the bottom face of the pile without friction and they provide rigid supports therefor.

The modification shown in Fig. 23 is similar to the one described with reference to Fig. 22, and the same letters of reference have been used to indicate corresponding parts. However, in lieu of the segmental plates 132 rollers 137 are provided which are rotated in the same way as the rollers 135.

I claim:
1. In an apparatus for taking flexible sheets from a pile thereof and conveying the same to an apparatus for further treatment, comprising a rotary frame, a gripping roll eccentrically mounted on said frame and revolving therewith, a set of rollers circumferentially mounted on said frame near said roll, means for holding said pile substantially in a stationary position upon said rollers, the outer parts of said roll and rollers being located substantially on a common circle, gear wheels connected respectively with said roll and rollers and having diameters substantially equal respectively to the diameters of said roll and rollers, a stationary internal gear meshing with said gear wheels, means to rotate said frame, and gripping means on said roll adapted to engage the forward portions of the sheet of the pile bearing on said roll and rollers.

2. In an apparatus for taking flexible sheets from a pile thereof and conveying the same to a device for further treatment, comprising a rotary frame, a gripping device and pile supporting bars circumferentially mounted on said frame, stationary supporting means for one edge of said pile, said stationary means being inclined upwardly from the periphery formed by said supporting bars and gripping device, and means to vary the position of said inclined supporting means relatively to said bars and gripping means.

3. In an apparatus for taking sheets from a pile and conveying the same to a device for further treatment, comprising a rotary cylindrical conveying device for supporting said pile, sheet gripping means cooperating with said conveying device for also supporting said pile, stationary pile supporting means for supporting at least one edge of said pile, and means to vary the angle of inclination of said inclined supporting means relative to the periphery of said cylinder.

4. Apparatus for taking flexible sheets from a stack and carrying the same to a device for further treatment, comprising a rotatable cylindrical member forming a bottom for said stack, means for holding said stack in a substantially stationary position upon the periphery of said member while said member rotates, rotary means forming a portion of said periphery for detaching the lowermost sheet from said stack during the rotation of said cylindrical member, said sheet-detaching means being in the form of a roll having a notch formed at the part of its circumference adapted to meet the front edge of the bottom sheet of said stack, said notch having an inwardly curved wall and adapted to be engaged by the front part of the said sheet, and suction means opening through the said curved wall for gripping the said front edge of the sheet.

RUDOLF HEPP.

REFERENCES CITED

The following references are of record in the file of this patent:

UNITED STATES PATENTS

| Number | Name | Date |
| --- | --- | --- |
| 626,675 | Crowell | June 13, 1899 |
| 1,023,138 | Dulin | Apr. 16, 1912 |
| 1,071,928 | Koerner | Sept. 2, 1913 |
| 1,520,022 | Grunlee | Dec. 23, 1924 |
| 1,153,295 | Dunnebier et al | Sept. 14, 1915 |
| 1,986,800 | Elliott | Jan. 8, 1935 |
| 2,259,672 | Waller | Oct. 21, 1941 |
| 1,619,711 | Engstrom | Mar. 1, 1927 |
| 2,279,269 | Tornberg | Apr. 7, 1942 |
| 2,279,270 | Tornberg et al | Apr. 7, 1942 |